3,105,846
PROCESS FOR PRODUCING ARYL
PHOSPHATE ESTERS
Edward Norwood Wheeler and Peter Paul Gesting, Corpus Christi, Tex., assignors to Celanese Corporation of America, New York, N.Y., a corporation of Delaware
Filed Mar. 8, 1961, Ser. No. 94,238
17 Claims. (Cl. 260—461)

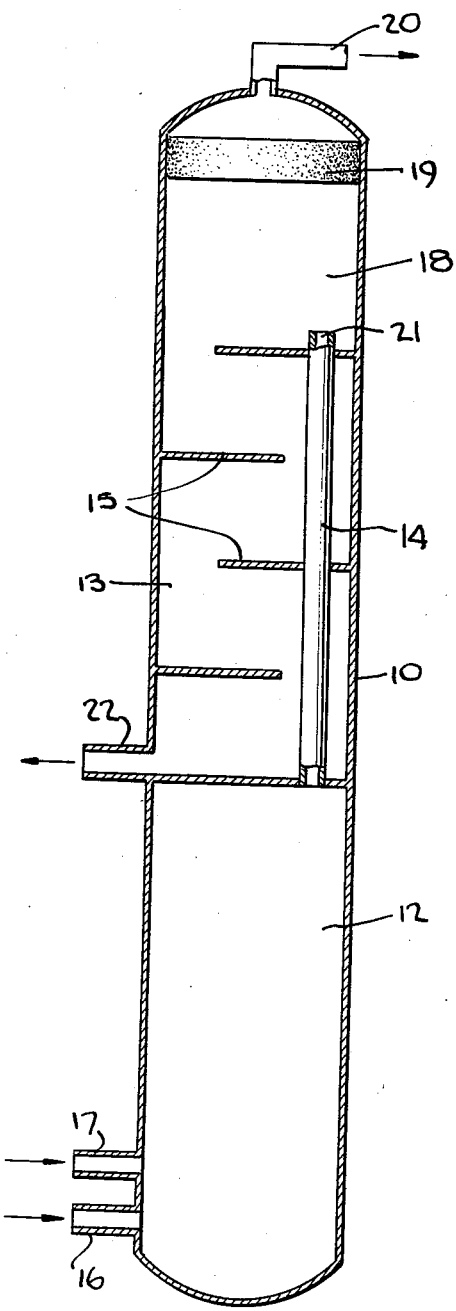

This invention relates to the production of prosphate esters. More particularly it relates to improvements in the formation of esters of oxyacids of phosphorus involving the known reaction between a chloride of an oxyacid of phosphorus, e.g. phosphorus oxychloride, and a phenol, such as cresols, naphthols, xylenols, ethylphenols, chlorophenols or mixtures thereof.

Conventional procedures were often hampered because the reaction did not go to completion thereby, resulting in low yields. Furthermore, considerable quantities of unreacted chlorides of oxyacids of phosphorus were usually entrained by the hydrogen chloride gas produced by this reaction. This made necessary the additional procedure of recovering these unreacted chlorides from the HCl gas e.g., by scrubbing of the hydrogen chloride gas. In addition, conventional procedures were also subject to an undesirable corrosive effect on apparatus by the reaction mixture of chlorides of oxyacids of phosphorus and phenols.

It is an object of this invention to provide a new and economical process for the production of high yields of phosphate esters.

It is another object of this invention to provide a process for the production of high yields phosphate esters from chlorides of oxyacids of phosphorus and phenols which has minimal entrainment of phosphorus oxyacid chlorides in the hydrogen chloride gas given off.

It is another object of this invention to provide a process for the production of phosphate esters from chlorides of oxyacids of phosphorus and phenols which process provides novel and more efficient techniques for heating the reactants.

Another object of this invention is the provision of a novel chemical apparatus especially suitable for use in the manufacture of phosphate esters.

Other objects of this invention will become apparent from the following detailed description and claims. In this description and claims all proportions are by weight unless otherwise indicated.

In accordance with one aspect of this invention a mixture comprising a chloride of an oxyacid of phosphorus and a phenol are initially reacted at elevated temperatures but before the reaction can go to completion, the reaction mixture is subjected to conditions which limit back-mixing and permitted to go to completion under such conditions. Back-mixing as used in this specification and claims refers to recirculation of the reaction mixture which permits reactants at varying stages of reaction to come into contact with each other, for example, where the reaction is a continuous one, the fresh reactants being fed come into contact with the reaction products at various intermediate stages of completion. In the process of this invention, the reactants are preferably permitted initially to back-mix freely. The hydrogen chloride gas produced by the reaction bubbles through the reaction mixture agitating the mixture to produce extensive back-mixing. The partially reacted mixture may be subjected to conditions diminishing back-mixing by transferring said mixture to a zone or reactor in which the reaction mixture is at an advanced stage of completion. As the reaction advances to completion, the hydrogen chloride gas production decreases and the back-mixing due to the agitation caused by the gas decreases. Accordingly, back-mixing in such a zone or reactor is diminished. Preferably, the reaction mixture contained in this zone has sufficiently advanced to that stage of completion where there is very little hydrogen chloride gas given off. In order to maintain a reaction mixture in said zone at a sufficiently advanced stage of completion, it is preferable that the initial reaction be allowed to go to at least 50% completion and most preferably 85% completion before being transferred to the advanced reaction zone.

The percentage of completion is based on the percentage of the total chlorine atoms in phosphorus oxychloride which are replaced or upon the percent HCl gas already evolved of the total HCl gas calculated to be evolved.

While back-mixing in the advanced reaction zone may be diminished through the use of impediments to back-mixing such as cut baffles, perforated baffles, packing e.g., Berl saddles, it has been found most advantageous to conduct the advanced or terminal reaction as a continuous reaction in which the reaction mixture flows downwardly as it progressively advanced to completion in the advanced zone. It has been found that back-mixing of the reaction mixture in the process of this invention is caused primarily by the bubbling action of the hydrogen chloride gas evolved. It has been further found that as the reaction progresses to completion, the evolution of hydrogen chloride gas progressively decreases. Since the evolved hydrochloride gas flows upwardly, there is progressively diminished back-mixing in the advanced zone of the downwardly flowing reaction mixture as it advances toward completion.

The process is preferably a continuous one in which the reactants are continuously fed to a first reaction zone maintained at an elevated temperature in which there is considerable back-mixing due primary to the bubbling of the hydrogen chloride gas produced which is removed overhead. This back-mixing provides for a thorough scrubbing of the HCl gas being evolved in order that the amounts of the unreacted phosphorus oxyacid chlorides being entrained over with the gas are maintained at a minimum. The reaction mixture is continuously withdrawn from the first reaction zone preferably at such a rate that the reaction has advanced to such stage of completion that the evolution of hydrogen chloride gas in the withdrawn mixture has been substantially reduced. The withdrawn mixture is then fed to a second zone in which there is diminished back-mixing due to the substantially diminished evolution of hydrogen chloride gas. Any hydrogen chloride gas which may be produced in the second zone passes off overhead. The residue is withdrawn from the second zone at such a rate that the reaction has sufficient time to go to completion. The withdrawn residue contains the phosphate ester. As hereinabove set forth, it has been found advantageous to have the reaction mixture flow downwardly as it progressively advances to completion in the second zone. The greatest proportion of any hydrogen chloride gas which may be formed in the second zone will be formed in the earlier stages of progress of the reaction mixture toward completion in the second zone. Accordingly, such gas will be formed in the upper part of the second zone from which, it may pass overhead with minimal agitating and back-mixing effect on the mixture particularly that portion of the mixture at the most advanced stages of completion found at the lowermost point of the second zone. In this continuous reaction it has been found advantageous to apply heat to only the initial reaction zone. No heat need be applied to the second zone as the reaction mixture being fed from the initial zone contains sufficient heat to maintain the temperature of the second zone at a desirable level. This is particularly true, for example, where phosphorous oxychloride and cresylic acid are reacted to produce tricresyl phosphate in an exothermic reaction. Preferred temperaures for this process are from about 150° C. to 290° C. and most preferably from about 190° to 240° C. Primarily for convenience, it has been found advantageous to conduct this process under atmospheric pressures.

The initial reaction preferably lasts from about 30 to 300 minutes while the continued reaction lasts from about 30 to 180 minutes.

It is preferred to use from about 3.1 to 4.0 moles of a phenol per mole of oxyacid chloride of phosphorus.

The reaction is preferably conducted in the presence of a catalyst which preferably constitutes from 0.1 to 1.0% the reaction mixture. Among the preferred catalysts are titanium esters, particularly titanate esters of the same phenols as those employed in the reaction. Magnesium chloride, stannic chloride and titanium tetrachloride are also good catalysts.

In accordance with another aspect of this invention, a novel method of heating has been found which will eliminate the disadvantages of conventional processes for heating the reaction mixture and provide a more efficient process for the production of esters of oxyacids of phosphorus.

In conventional procedures, which employ heating means such as heating the walls of the reactor e.g., by heated jackets or heating by means of a reboiler, the reaction mixture has been found to be highly corrosive with respect to the heated walls or the heating surfaces of the reboiler. This is due to the fact that in order to maintain the preferred temperatures in the reaction zone, the heating surfaces and walls have to be heated to temperatures considerably above the temperatures of the reaction mixture. At these temperatures, the above-mentioned corrosive effects occur. Applicants' novel heating process eliminates the need for external heating means such as reboilers or heating jackets.

In accordance with this novel heating process, the temperature of the reaction mixture is maintained at a desirable level by heating the phenol being fed into the reaction mixture and most preferably by heating the phenol to a temperature at which a portion of the phenol is vaporized prior to the addition of the phenol to the reaction. The partially vaporized phenol in which the vapor and liquid phases are in equilibrium is then added to the chloride of an oxyacid of phosphorus in the reactor in which the concentration of the reactants admixed is such that the vaporized phenol condenses liberating heat to raise the temperature of the reactants, that is the partial pressure of the phenol in the reaction admixture is less than that of the vapor pressure of the liquid phenol in the partially vaporized phenol being added.

The phenol may be vaporized by passing the phenol through a steam or direct fired heater operated so as to vaporize all or part of the phenol.

The conditions and proportions suitable for accomplishing such heating by condensation will of course vary with the reactants used. For example when cresylic acid having a composition such as that set forth in the illustrative example, hereinafter described, is reacted with phosphorus oxychloride in a continuous reaction up to 50% or more of cresylic acid is preferably vaporized by subjecting the acid to a temperature preferably from about 208° to 227° C. and atmospheric pressure. Then, once steady state conditions are established, the partially vaporized cresylic acid is fed into a reaction zone simultaneously with the feeding of liquid phosphorus oxychloride. The reactants are fed in the hereinabove stated preferred proportions and the reaction zone is preferably maintained at temperatures of from 190 to 240° C. and at about atmospheric pressure. With these conditions and proportions, the vaporized cresylic acid will condense liberating heat which maintains the reactor temperature.

While the foregoing proportions represent the preferred ranges of proportions of cresylic acid vaporized to maintain the initial reaction zone at the stated preferred temperatures, it will be obvious that these ranges are not critical and that other factors will affect the temperature of the initial reaction zone and consequently the proportion of cresylic acid which should be vaporized to maintain the desired temperatures in the initial zone e.g., heat losses due to the nature of the reactor and other apparatus may lower the temperature of the reaction zone, thus necessitating the vaporization of a greater portion of the cresylic acid.

In order to insure the continuous operation of the process, the extent of vaporization of the cresylic acid in the vaporizing apparatus may be automatically controlled by apparatus activated by temperature changes in the initial reaction zone to effect changes in the extent of vaporization of the cresylic acid in the vaporization apparatus. For example a thermostat in the initial reaction zone may respond to lowering of the temperature in said zone to activate means for adding more heat to the vaporization apparatus in order that a greater portion of the cresylic acid be vaporized.

The invention is illustrated further in the accompanying drawing which is a diagrammatic view of a reactor which may be used in the practice of this invention.

In the drawing, the reactor is in the form of a cylindrical vessel or tower 10 having partition 11 which separates the tower into a lower reaction zone 12 and an upper reaction zone 13. The lower and upper zones are connected by conduit 14 which may conveniently be a pipe. Upper zone 13 is provided with baffles 15 to diminish back-mixing or recirculation. The partially vaporized phenol and the chloride of any oxyacid of phosphorus are continuously fed to the tower at 16 and 17 respectively. In the lower zone 12, the vaporized phenol condenses giving up heat and the reaction proceeds. Hydrogen chloride gas is evolved and passes out of lower zone 12 up through conduit 14 through liquid disengaging space 18, through mist eliminator and out overhead at 20. Considerable back-mixing takes place in lower zone 12 effected primarily through the agitating effect of the hydrogen chloride gas evolved. The reactants are added at such rate that lower zone 12 is maintained full. The reaction mixture should pass through zone 12 and pass through conduit 14 and opening 21 into upper zone 13 before the mixture is completely reacted. In zone 13, where the reaction goes to completion, back-mixing is diminished by the substantially reduced hydrogen chloride gas evolution, by the downward flow of the reaction mixture as the reaction progresses toward completion and by baffles 15. Any hydrogen chloride gas which may be evolved in zone 13 also passes up through liquid disengaging space 18 and mist eliminator 19 and out overhead. The fully reacted product is continually withdrawn from the bottom of upper zone 13 at 22.

It will be understood that the reactor according to this invention may vary considerably in structure. For example, the initial reaction zone and the reaction completion zone may be in two separate vessels.

Also a tower having an upper zone with few impediments to back-mixing and a lower zone with baffles or other impediments to back-mixing may be used. The lower zone may be separated from the upper zone by a perforated partition which prevents any substantial transfer of agitation from the upper back-mixing zone to the lower zone. The reactants are fed to the upper zone where the initial partial reaction takes place, the bubbling action of the evolved HCl gas agitating the reactants in the upper zone. The partially reacted mixture then passes through the perforated partition to the lower zone where the reaction is completed with minimized back-mixing. The reaction mixture is fed to the upper portion of the lower zone and flows downwardly as the reaction progresses to completion. The product is withdrawn from the lower zone.

The following example is given to illustrate this invention further.

*Example*

Using the apparatus shown in the drawing, cresylic acid having an average molecular weight of 121 and the following approximate composition:

|  | Percent |
|---|---|
| $C_{10}$ phenols | 0.5 |
| $C_9$ phenols | 10.0 |
| Xylenols | 72.0 |
| Cresols | 14.5 |
| Phenol | 3.0 | was continuously passed through a direct fired heater at a rate of 0.50 lb. moles per minute (60 lb. per min.). The cresylic acid was heated to its boiling point (212° C.) and partially vaporized at atmospheric pressure. The heater fuel feed rate was controlled by the reactor temperature. As additional heat was supplied to the heater, a greater percentage of the cresylic acid feed was vaporized. At a reactor temperature of 200° C. approximately 30% of the cresylic acid was vaporized and fed to point 16 on a reaction tower of the type shown in the drawing to maintain zone 12 at a temperature of 200° C. Liquid phosphorus oxychloride was fed to point 17 on said tower at the rate of 0.15 lb. moles per min., and freshly ground magnesium chloride was also fed to point 17 at the rate of 0.0035 lb. moles (0.33 lb.) per min. Hydrogen chloride gas was evolved and passed out overhead from the tower agitating the reactants to cause back-mixing. The reaction went to 80% completion in the lower zone. The reaction mixture from lower zone 12 overflowed through conduit 14 into upper zone 13. The temperature of the upper zone 13 was 196° C. The reaction mixture had a residence time of about 1.5 hours in the upper zone 13 and a residence time of about 1.5 hours in zone 12. In zone 12 the HCl was evolved at a rate of about 0.19 lb. of HCl per min. per lb. of final reactor product. In zone 13 the HCl was evolved at a rate of 0.05 lb. of HCl per min. per lb. of product. Any cresylic acid carried overhead by the HCl gas may be recovered by passing said gas through a cooler maintained at 30° C. to condense the cresylic acid. The condensed cresylic acid may then be returned to the tower at point 17. The crude reactor product was removed from zone 13 of the reactor at point 22 at a rate of about 67 lb. per min. (approximately 0.15 lb. moles per min.). The acidity of the product was 7 to 10 mg. KOH per gram which indicated at least a 97% yield of tricresyl phosphate based on the $POCl_3$ fed to the reactor. The crude product mixture contained about 8 wt. percent cresylic acid.

It is to be understood that the foregoing detailed description is given merely by way of illustration and that many variations may be made therein without departing from the spirit of our invention.

Having described our invention what we desire to secure by Letters Patent is:

1. A process for the production of esters which comprises partially reacting at elevated temperatures a mixture comprising a chloride of an oxyacid of phosphorus and a phenol and then continuing the reaction under diminished back-mixing conditions.

2. The process set forth in claim 1 wherein the partial reaction is allowed to advance to a stage of completion at which there is a diminution of the hydrogen chloride gas given off by the reaction mixture.

3. A process for the continuous production of esters which comprises continuously adding a chloride of an oxyacid of phosphorus and a phenol to the products of an incomplete reaction of said ingredients in a first reaction zone maintained at elevated temperatures, continuously withdrawing from said first zone a portion of reaction mixture before the reaction goes to completion and feeding said reaction mixture to a second reaction zone wherein the reaction is completed under diminished back-mixing conditions.

4. The process set forth in claim 3 wherein the rate of withdrawal from the first reaction zone is such that the reaction has advanced to a stage of completion at which there is a diminution of the hydrogen chloride gas given off by the withdrawn reaction mixture.

5. The process set forth in claim 4 wherein the reaction mixture is moved in downward direction in the second zone as said reaction progresses towards completion.

6. The process set forth in claim 3 wherein heat is applied only to the first reaction zone.

7. The process set forth in claim 6 wherein said heat is applied by preheating said phenol prior to the addition thereof to said first zone.

8. A process for the production of esters which comprises adding a phenol at least a portion of which is in the vapor phase to a chloride of an oxyacid of phosphorus in the liquid phase, and condensing the phenol to liberate heat to the resulting reaction mixture.

9. A process for the production of esters which comprises adding a partially vaporized phenol to a chloride of an oxyacid of phosphorus in the liquid phase, the partial pressure of the phenol in the resulting mixture of the chloride of an oxyacid of phosphorus and the phenol in the liquid phase being less than the vapor pressure of the liquid phenol in the partially vaporized phenol being added whereby phenol vapor condenses liberating heat to raise the temperature of the reactants.

10. A process for the production of esters which comprises partially reacting a partially vaporized phenol with a chloride of an oxyacid of phosphorus in the liquid phase, the partial pressure of the phenol in the resulting mixture of the chloride of an oxyacid of phosphorus and the phenol in the liquid phase being less than the vapor pressure of the liquid phenol in the partially vaporized phenol being added whereby phenol vapor condenses liberating heat to raise the temperature of the reactants, and then continuing the reaction in the substantial absence of added phenol vapor.

11. A process for the continuous production of esters which comprises continuously and separately feeding a chloride of an oxyacid of phosphorus in the liquid phase and a partially vaporized phenol to a first reaction zone containing the products of an incomplete reaction of said ingredients, continuously withdrawing a portion of the reaction mixture from said first zone prior to the completion of the reaction and feeding said reaction mixture to a second reaction zone having conditions limiting back-mixing, the resulting partial pressure of the phenol in the liquid phase in the first reaction zone being less than the vapor pressure of liquid phenol in the partially vaporized phenol feed whereby phenol vapor condenses liberating heat to maintain the reaction zones at elevated temperatures.

12. The process set forth in claim 11 wherein the reaction mixture is moved in a downward direction in the second zone as said reaction progresses towards completion.

13. The process set forth in claim 3, wherein phosphorus oxychloride and a monohydric phenol are added to the products of the incomplete reaction.

14. The process set forth in claim 13, wherein said monohydric phenol is cresylic acid.

15. The process according to claim 11, wherein phosphorus oxychloride and a monohydric phenol are added to the first reaction zone.

16. The process set forth in claim 4, wherein said reaction mixture contains a catalyst for the reaction.

17. A process for the production of esters which comprises continuously vaporizing part of a phenol, continuously adding said partially vaporized phenol to a chloride of an oxyacid of phosphorus, continuously condensing said phenol to liberate heat to maintain the temperature of the resulting reaction mixture at a selected temperature level and continuously controlling the extent of vaporization of said phenol responsive to changes in said selected temperature level.

References Cited in the file of this patent

UNITED STATES PATENTS 2,078,421   Shuman ---------------- Apr. 27, 1937
2,575,855   Stengel et al. ------------ Nov. 20, 1951